United States Patent
Karkos et al.

(10) Patent No.: US 11,174,741 B2
(45) Date of Patent: Nov. 16, 2021

(54) PLATFORM FOR AN AIRFOIL OF A GAS TURBINE ENGINE

(71) Applicant: United Technologies Corporation, Farmington, CT (US)

(72) Inventors: Peter Karkos, Ivoryton, CT (US); Arun K. Theertham, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 410 days.

(21) Appl. No.: 15/956,903

(22) Filed: Apr. 19, 2018

(65) Prior Publication Data
US 2019/0323366 A1    Oct. 24, 2019

(51) Int. Cl.
*F01D 5/30* (2006.01)

(52) U.S. Cl.
CPC ......... *F01D 5/3053* (2013.01); *F01D 5/3007* (2013.01); *F05D 2220/32* (2013.01); *F05D 2240/80* (2013.01); *F05D 2260/30* (2013.01)

(58) Field of Classification Search
CPC .... F01D 11/008; F01D 5/3007; F01D 5/3053; F05D 2220/32; F05D 2220/36; F05D 2230/30; F05D 2240/80; F05D 2260/30; F05D 2300/133; F05D 2300/174
See application file for complete search history.

(56) References Cited

U.S. PATENT DOCUMENTS

| | | | |
|---|---|---|---|
| 6,481,971 B1 | 11/2002 | Forrester | |
| 2008/0226458 A1 | 9/2008 | Pierrot et al. | |
| 2011/0142684 A1* | 6/2011 | Campbell | B23P 15/04 |
| | | | 416/248 |
| 2017/0022824 A1* | 1/2017 | Turner | B29C 70/70 |
| 2017/0145829 A1 | 5/2017 | Tatton | |
| 2017/0145838 A1 | 5/2017 | Tatton | |

FOREIGN PATENT DOCUMENTS

EP    3121386 A1    1/2017

OTHER PUBLICATIONS

European Search Report for European Application No. 19170142.2, International Filing Date Apr. 18, 2019, dated Aug. 23, 2019, 2019, 8 pages.
European Office Action for European Application No. 19170142.2, International Filing Date Apr. 18, 2019, dated Aug. 4, 2020, 4 pages.

* cited by examiner

*Primary Examiner* — J. Todd Newton
*Assistant Examiner* — Julian B Getachew
(74) *Attorney, Agent, or Firm* — Cantor Colburn LLP (57) ABSTRACT

Platforms for airfoils in gas turbine engines are provided. The platforms include an aero-structure defining a gaspath surface and a non-gaspath surface, a first securing element arranged to receive a locking pin and secure the aero-structure to a rotor disk, and a first securing element structure extending between the non-gaspath surface and the first securing element, wherein the first securing element structure comprises at least two legs defining a hollow space between the two legs and the non-gaspath surface.

18 Claims, 6 Drawing Sheets

PLATFORM FOR AN AIRFOIL OF A GAS TURBINE ENGINE

BACKGROUND

The subject matter disclosed herein generally relates to airfoil platforms used in gas turbine engines and, more particularly, to airfoil platforms.

Gas turbine engines generally include a fan section, a compressor second, a combustor section, and turbine sections positioned along a centerline referred to as an "axis of rotation." The fan, compressor, and combustor sections add work to air (also referred to as "core gas") flowing through the engine. The turbine extracts work from the core gas flow to drive the fan and compressor sections. The fan, compressor, and turbine sections each include a series of stator and rotor assemblies. The stator assemblies, which do not rotate (but may have variable pitch vanes), increase the efficiency of the engine by guiding core gas flow into or out of the rotor assemblies.

The fan section includes a rotor assembly and a stator assembly. The rotor assembly of the fan includes a rotor disk and a plurality of outwardly extending rotor blades. Each rotor blade includes an airfoil portion, a dove-tailed root portion, and a platform. The airfoil portion extends through the flow path and interacts with the working medium gases to transfer energy between the rotor blade and working medium gases. The dove-tailed root portion engages attachment means of the rotor disk. The platform typically extends circumferentially from the rotor blade to a platform of an adjacent rotor blade. The platform is disposed radially between the airfoil portion and the root portion. The stator assembly includes a fan case, which circumscribes the rotor assembly in close proximity to the tips of the rotor blades.

To reduce the size and cost of the rotor blades, the platform size may be reduced and a separate fan blade platform may be attached to the rotor disk. To accommodate the separate fan blade platforms, outwardly extending tabs or lugs may be forged onto the rotor disk to enable attachment of the platforms. Improved rotor systems and/or platforms may be advantageous.

SUMMARY

According to some embodiments, platforms for airfoils in gas turbine engines are provided. The platforms include an aero-structure defining a gaspath surface and a non-gaspath surface, a first securing element arranged to receive a locking pin and secure the aero-structure to a rotor disk, and a first securing element structure extending between the non-gaspath surface and the first securing element, wherein the first securing element structure comprises at least two legs defining a hollow space between the two legs and the non-gaspath surface.

In addition to one or more of the features described above, or as an alternative, further embodiments of the platforms may include that the platform is made of metal.

In addition to one or more of the features described above, or as an alternative, further embodiments of the platforms may include a second securing element arranged to receive the locking pin and secure the aero-structure to a rotor disk, wherein the second securing element is axially aligned with the first securing element and a second securing element structure extending between the non-gaspath surface and the second securing element.

In addition to one or more of the features described above, or as an alternative, further embodiments of the platforms may include that the second securing element structure comprises at least two legs defining a hollow space between the two legs and the non-gaspath surface.

In addition to one or more of the features described above, or as an alternative, further embodiments of the platforms may include a connector connecting the first securing element structure to the second securing element structure.

In addition to one or more of the features described above, or as an alternative, further embodiments of the platforms may include a third securing element arranged to receive the locking pin and secure the aero-structure to a rotor disk, wherein the third securing element is axially aligned with the first securing element and the second securing element and a third securing element structure extending between the non-gaspath surface and the third securing element.

In addition to one or more of the features described above, or as an alternative, further embodiments of the platforms may include that the third securing element structure comprises at least two legs defining a hollow space between the two legs and the non-gaspath surface.

In addition to one or more of the features described above, or as an alternative, further embodiments of the platforms may include a fourth securing element arranged to receive the locking pin and secure the aero-structure to a rotor disk, wherein the fourth securing element is axially aligned with the first securing element, the second securing element, and the third securing element and a fourth securing element structure extending between the non-gaspath surface and the fourth securing element.

In addition to one or more of the features described above, or as an alternative, further embodiments of the platforms may include that the fourth securing element structure comprises at least one leg defining a hollow space between the leg and the non-gaspath surface.

In addition to one or more of the features described above, or as an alternative, further embodiments of the platforms may include that the first securing element structure comprises four legs.

In addition to one or more of the features described above, or as an alternative, further embodiments of the platforms may include that the first securing element structure further comprises a neck located between the at least two legs and the first securing element, wherein the neck extends from a point where material of the at least two legs join together.

In addition to one or more of the features described above, or as an alternative, further embodiments of the platforms may include that the first securing element structure has at least one of a hollow internal structure, a honey comb internal structure, or a lattice internal structure.

According to some embodiments, gas turbine engines are provided. The gas turbine engines include a rotor disk, an airfoil installed to the rotor disk, and a platform installed to the rotor disk adjacent the airfoil. The platform includes an aero-structure defining a gaspath surface and a non-gaspath surface, a first securing element arranged to receive a locking pin and secure the aero-structure to a rotor disk, and a first securing element structure extending between the non-gaspath surface and the first securing element, wherein the first securing element structure comprises at least two legs defining a hollow space between the two legs and the non-gaspath surface.

In addition to one or more of the features described above, or as an alternative, further embodiments of the gas turbine engines may include that the platform is made of metal.

In addition to one or more of the features described above, or as an alternative, further embodiments of the gas turbine engines may include a second securing element arranged to receive the locking pin and secure the aero-structure to a rotor disk, wherein the second securing element is axially aligned with the first securing element and a second securing element structure extending between the non-gaspath surface and the second securing element.

In addition to one or more of the features described above, or as an alternative, further embodiments of the gas turbine engines may include that the second securing element structure comprises at least two legs defining a hollow space between the two legs and the non-gaspath surface.

In addition to one or more of the features described above, or as an alternative, further embodiments of the gas turbine engines may include a connector connecting the first securing element structure to the second securing element structure.

In addition to one or more of the features described above, or as an alternative, further embodiments of the gas turbine engines may include that the first securing element structure further comprises a neck located between the at least two legs and the first securing element, wherein the neck extends from a point where material of the at least two legs join together.

In addition to one or more of the features described above, or as an alternative, further embodiments of the gas turbine engines may include that the rotor disk includes an attachment lug configured to receive the first securing element of the platform to secure the platform to the rotor disk.

In addition to one or more of the features described above, or as an alternative, further embodiments of the gas turbine engines may include a locking pin installed through at least a portion of the attachment lug and the securing element of the platform.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Detailed descriptions of one or more embodiments of the disclosed apparatus and/or methods are presented herein by way of exemplification and not limitation with reference to the Figures.

Figure 1:
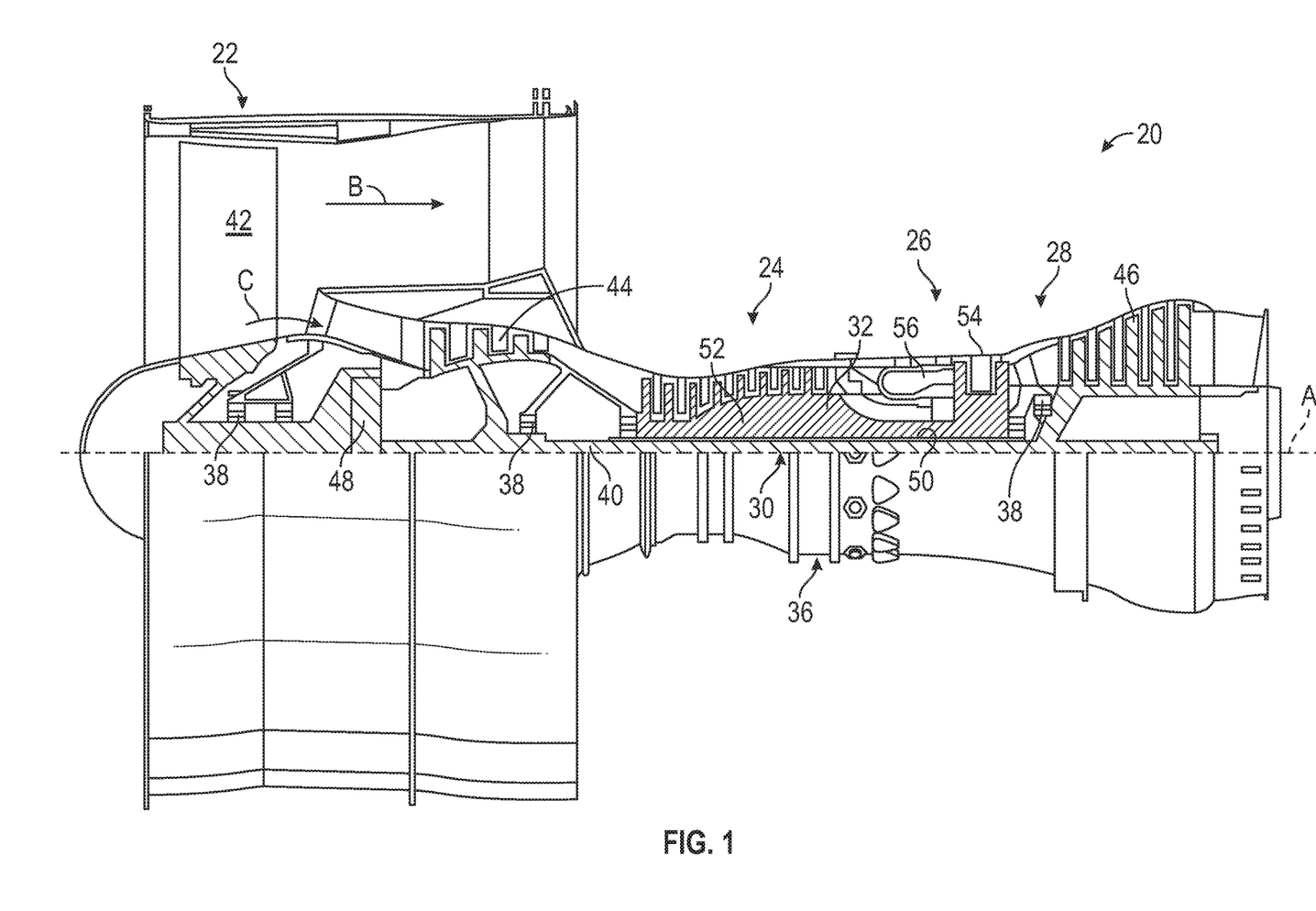
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets and turboshafts, wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
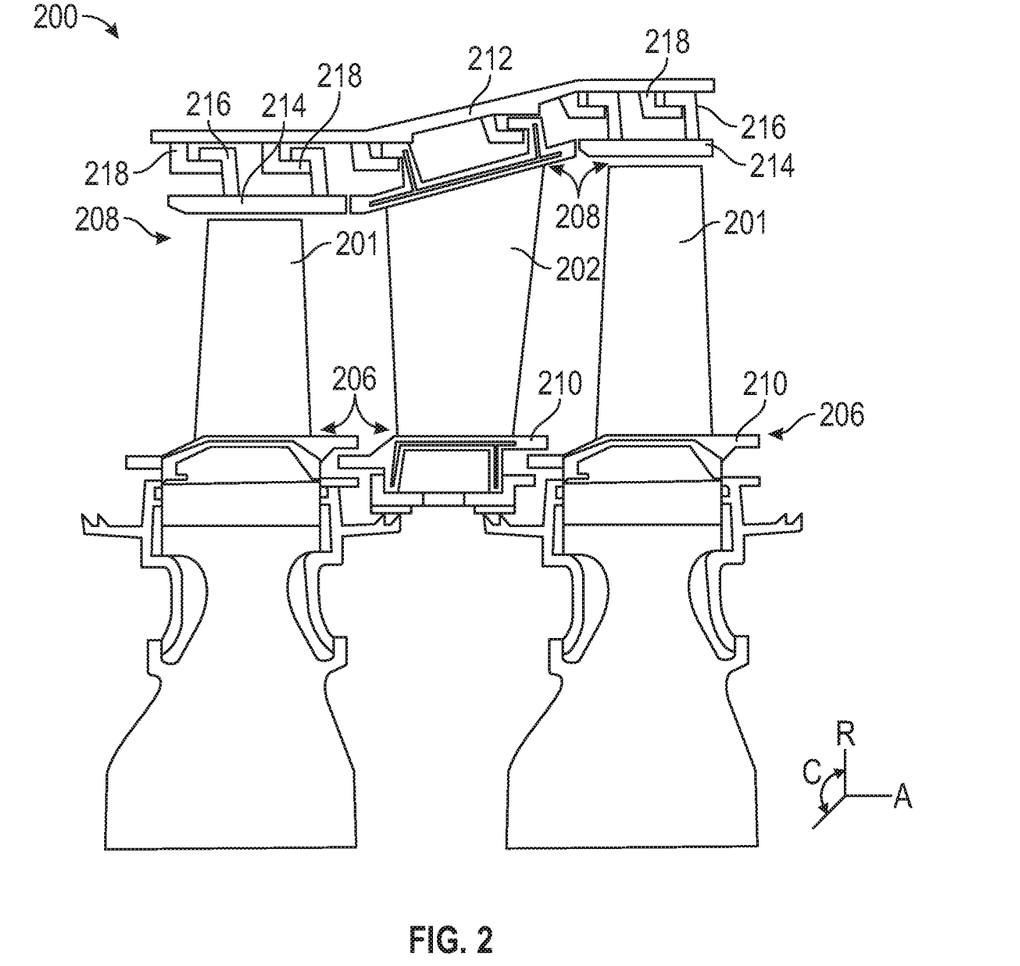
FIG. 2 is a schematic illustration of a portion of a turbine section of the gas turbine engine that may employ embodiments of the present disclosure.

FIG. 2 is a schematic view of a turbine section that may employ various embodiments disclosed herein. Turbine 200 includes a plurality of airfoils, including, for example, one or more blades 201 and vanes 202. The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions or internal walls or structures within the airfoils 201, 202 that may extend either from the inner diameter 206 or the outer diameter 208 of the airfoil 201, 202, or as partial sections therebetween. The partitions may extend for a portion of the length of the airfoil 201, 202, but may stop or end prior to forming a complete wall within the airfoil 201, 202. Multiple of the airfoil cavities may be fluidly connected and form a fluid path within the respective airfoil 201, 202. The blades 201 and the vanes 202, as shown, are airfoils that extend from platforms 210 located proximal to the inner diameter thereof. Located below the platforms 210 may be airflow ports and/or bleed orifices that enable air to bleed from the internal cavities of the airfoils 201, 202. A root of the airfoil may connect to or be part of the platform 210. Such roots may enable connection to a turbine disc, as will be appreciated by those of skill in the art.

The turbine 200 is housed within a case 212, which may have multiple parts (e.g., turbine case, diffuser case, etc.). In various locations, components, such as seals, may be positioned between the airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Figure 3A:
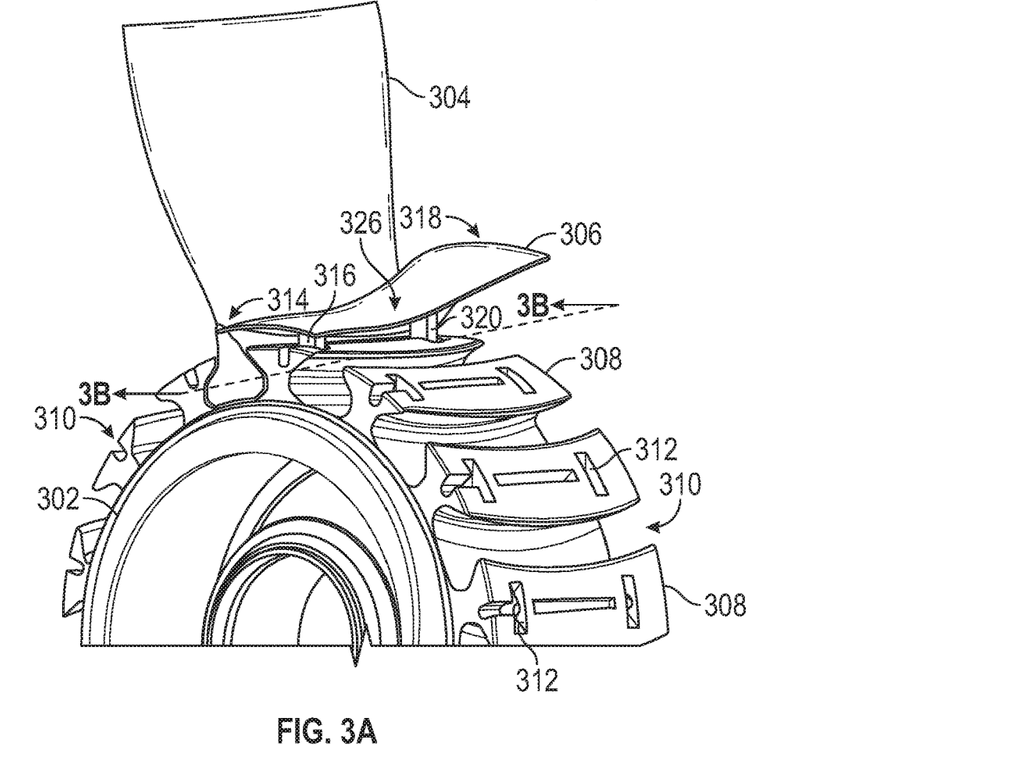
FIG. 3A is a schematic illustration of a rotor disk assembly that may employ embodiments of the present disclosure.
Figure 3B:
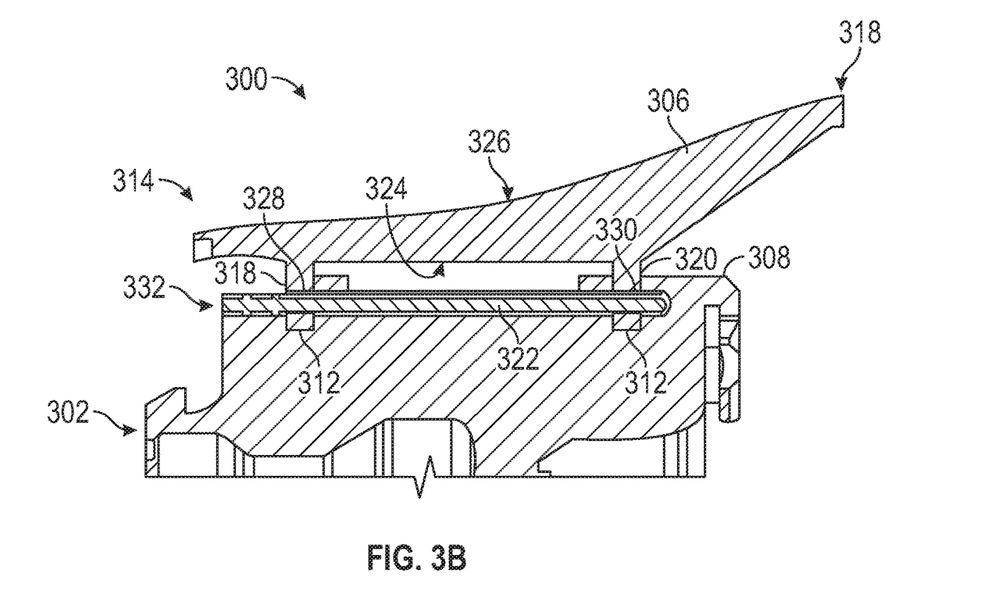
FIG. 3B is a cross-sectional illustration of a portion of the rotor disk assembly of FIG. 3A as viewed along the line 3B-3B.

Turning now to FIGS. 3A-3B, schematic illustrations of a rotor disk assembly 300 of a gas turbine engine are shown. FIG. 3A is an isometric illustration of the rotor disk assembly 300 and FIG. 3B is a cross-sectional view of the rotor disk assembly 300 as viewed along the line 3B-3B of FIG. 3A. The rotor disk assembly 300, as shown, includes a rotor disk 302, a blade 304, and a platform 306. The blade 304 may be a fan blade (e.g., for fan section 22 shown in FIG. 1) or a turbine blade (e.g., for a compressor section 24 or turbine section 28 shown in FIG. 1). Although shown with a single blade 304 and a single platform 306, those of skill in the art will appreciate that a number of blades and platforms are to be installed to the rotor disk 302 when installed into a gas turbine engine. Further, although a specific configuration and arrangement of elements is shown, those of skill in the art will appreciate that alternative arrangements are possible without departing from the scope of the present disclosure. That is, the present illustrations and discussion are merely for illustrative and explanatory purposes and are not intended to be limiting.

The rotor disk assembly 300 may be installed within a fan section of a gas turbine engine. As shown, the rotor disk 302 includes at least one attachment lug 308. The blade 304 is installed between two adjacent attachment lug 308 within a blade cavity 310. During installation of the fan section, the platform 306 is operably coupled to each of the attachment lug 308. As shown, each of the attachment lug 308 may include one or more slots 312 that are configured to receive a portion of a respective platform 306. For example, as shown, a front end 314 of the platform 306 may include a first connector 316 that may engage within a respective slot 312, and at back end 318 of the platform 306, a second connector 320 may engage with a respective slot 312. A locking pin 322 may be used to provide removable attachment between the platform 306 and the attachment lug 308.

The first connector 316 and the second connector 320 extend from a non-gaspath surface 324 of the platform 306, as will be appreciated by those of skill in the art. Opposite the non-gaspath surface 324 of the platform 306 is a gaspath surface 326, which may be contoured as appreciated by those of skill in the art. Each of the connectors 316, 320 include securing elements 328, 330, respectively, defining apertures for attachment. To secure the platform 306 to a respective attachment lug 308, the first connector 316 is inserted into a respective slot 312 at the front end 314 and the second connector 320 is inserted into a respective slot 312 at the back end 318. The locking pin 322 is inserted through an attachment aperture 332 to pass through each of the securing elements 328, 330 of the platform 306 and thus through the first connector 316 and the second connector 320.

New attachment lug designs have resulted in changes in the geometry of platforms to be attached thereto. Composite materials may be used to form the platforms, such as laminated carbon composite structures. Wrapped fabric may be employed to form such composite platforms. However, the manufacturing process, from design to build, can be time consuming and expensive, and if changes in a hub (e.g., rotor disk) are made, a redesign of the platform may be required to accommodate new attachment restrictions.

Hub changes have created a need to rethink the overall platform design. Advantageously, embodiments provided herein are directed to platform designs that enable accommodation with space restrictions, time constraints, and may address manufacturing difficulties associated with composite-manufactured platforms. That is, embodiments of the present disclosure are directed to metallic platform configurations. The metallic platforms of the present description allow for compliance with strict weight requirements for use in gas turbine engines. As such, in accordance with some embodiments, abnormal geometries may be employed for various aspects of the platforms. For example, a fan hub redesign may result in larger dimensions of the hub near the forward end of the platform, which in turn may leading to much less space between the fan hub outer diameter and the required aero flowpath.

In accordance with embodiments of the present disclosure, platform geometry was developed using a topology optimization process to compute a structurally efficient way to allocate material from the platform lugs to the flowpath. In accordance with a non-limiting embodiment of the present disclosure, a four-securing element constraint and flow surface constraint were applied, resulting unique geometries, as described herein. The unique geometry achieved platform legs that extend directly to locations that may minimize and reduce stress and deflection. Further, such geometries may eliminate unnecessary structure that may create a weight deficit. In some embodiments, titanium and titanium alloys may be employed for the platforms of the present disclosure. Advantageously, titanium and titanium alloys may provide a relative high specific strength and stiffness.

Figure 4A:
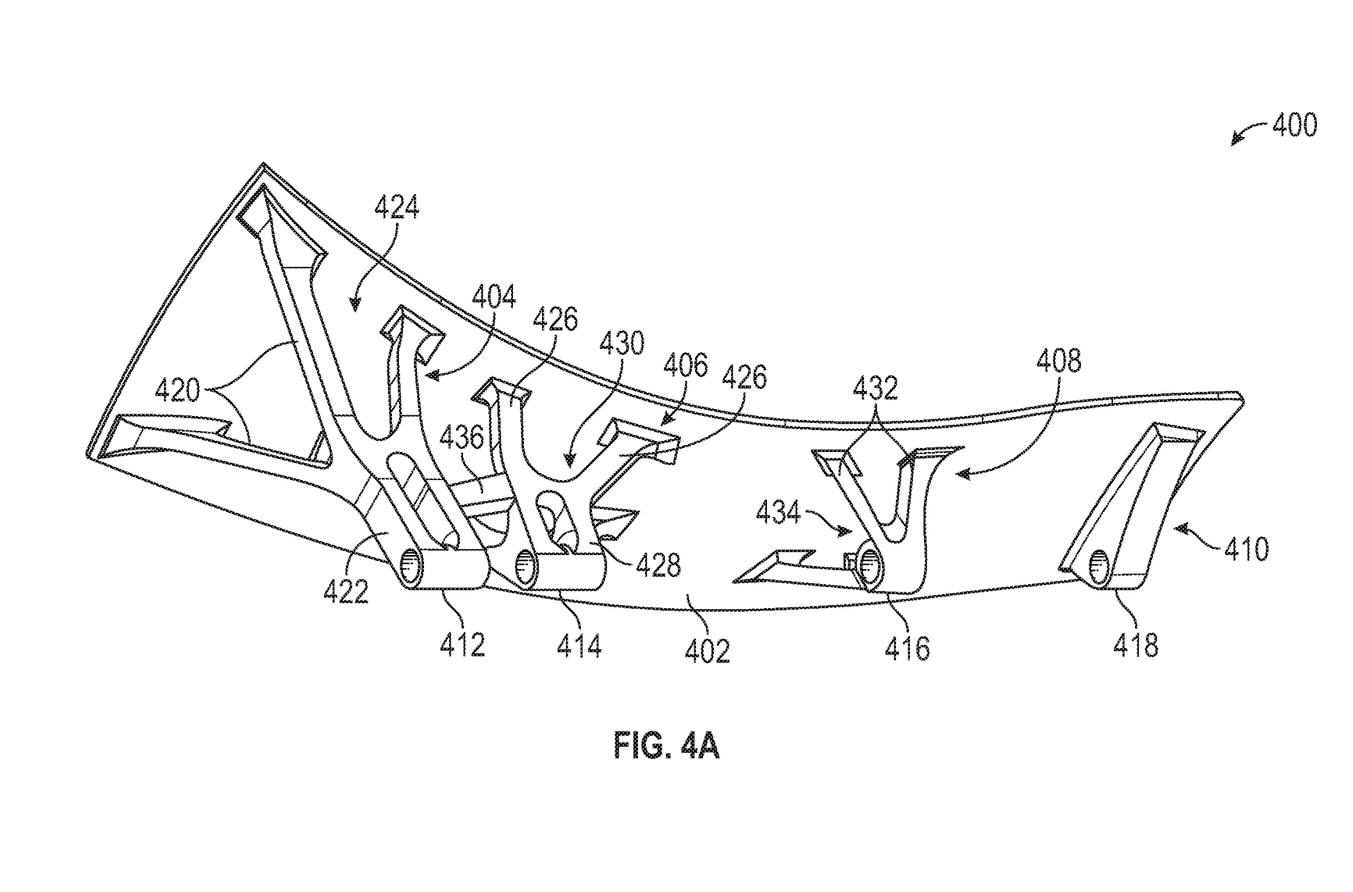
FIG. 4A is a schematic illustration of a platform in accordance with an embodiment of the present disclosure.
Figure 4B:
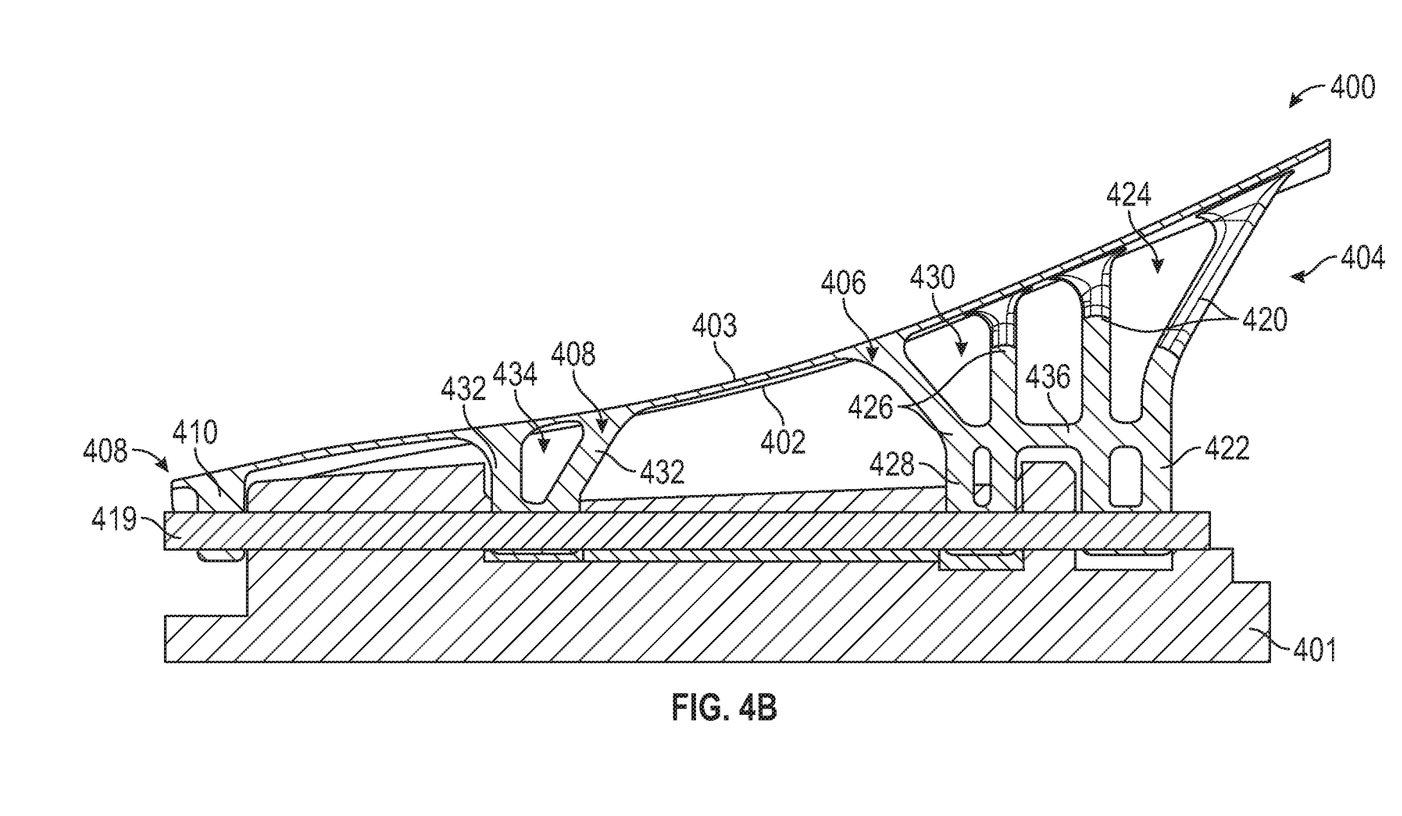
FIG. 4B is a side view illustration of the platform of FIG. 4A as installed to a rotor disk.

Turning now to FIGS. 4A-4B, schematic illustrations of a platform 400 for use in a gas turbine engine in accordance with an embodiment of the present disclosure is shown. FIG. 4A is an isometric illustration of a non-gaspath side of the platform 400 and FIG. 4B is a side elevation view of the platform 400 as installed to a rotor disk 401 of a gas turbine engine. The platform 400 includes a non-gaspath surface 402 and a gaspath surface 403 (shown in FIG. 4B). In this embodiment, the platform 400 includes a first securing element structure 404, a second securing element structure 406, a third securing element structure 408, and a fourth securing element structure 410. The securing element structures 404, 406, 408, 410 each include respective securing elements 412, 414, 416, 418. The securing elements 412, 414, 416, 418 define apertures for receiving a locking pin 419 therethrough, and thus the apertures of the securing elements 412, 414, 416, 418 are all axially aligned.

As shown, the first securing element structure 404 includes a plurality of first legs 420 and a first neck 422. The first legs 420 of the first securing element structure 404 define a first hollow space 424 between the individual first legs 420, the non-gaspath surface 402, and the first neck 422. The first legs 420 each originate or connect to the non-gas path surface 402 and extend therefrom toward the first securing element 412. The first neck 422 joins material of two or more of the first legs 420 and extends to the first securing element 412 to position the first securing element 412 at a desired position (e.g., for aligning apertures of the securing elements 412, 414, 416, 418).

Similarly, the second securing element structure 406 includes a plurality of second legs 426 and a second neck 428. The second legs 420 of the second securing element structure 406 define a second hollow space 430 between the individual second legs 426, the non-gaspath surface 402, and the second neck 428. The second legs 426 each originate or connect to the non-gas path surface 402 and extend therefrom toward the second securing element 414. The second neck 428 joins material of two or more of the second legs 426 and extends to the second securing element 414 to position the second securing element 414 at a desired position (e.g., for aligning apertures of the securing elements 412, 414, 416, 418).

The third securing element structure 408 is similar to the first and second securing element structures 404, 406, but does not include a neck. Instead, third legs 432 of the third securing element structure 408 extend from the non-gaspath surface 402 directed to the third securing element 416. The third legs 432 define a third hollow space 434 between the third legs 432, the non-gaspath surface 402, and the third securing element 416. The third legs 432 are arranged to position the third securing element 416 to be aligned with the other securing elements 412, 414, 418 to thus align apertures thereof for receiving a locking pin therethrough.

The fourth securing element 418 is directly connected to the non-gaspath surface 402 and does not include any legs or a neck similar to the other securing element structures 404, 406, 408, and thus the forth securing element structure 410 has a relatively simple construction and no hollow space is defined relative thereto.

The use of the hollow spaces 424, 430, 434 allows for the reduction of material used in the formation of the platform 400. However, because the platform 400 may be formed of metal (as compared to composites), the platform 400 will have sufficient strength and structural rigidity for use in a gas turbine engine. Thus, a relatively light-weight and yet structurally robust.

The locking pin 419 may pass through each of the securing elements 412, 414, 416, 418 to secure the platform 400 to the rotor disk 401. To provide additional rigidity to the platform 400, in some locations, one or more of the legs or necks of adjacent securing element structures may be connected. For example, as shown, the first securing element structure 404 is connected to the second securing element structure 406 by a connector 436.

Figure 5:
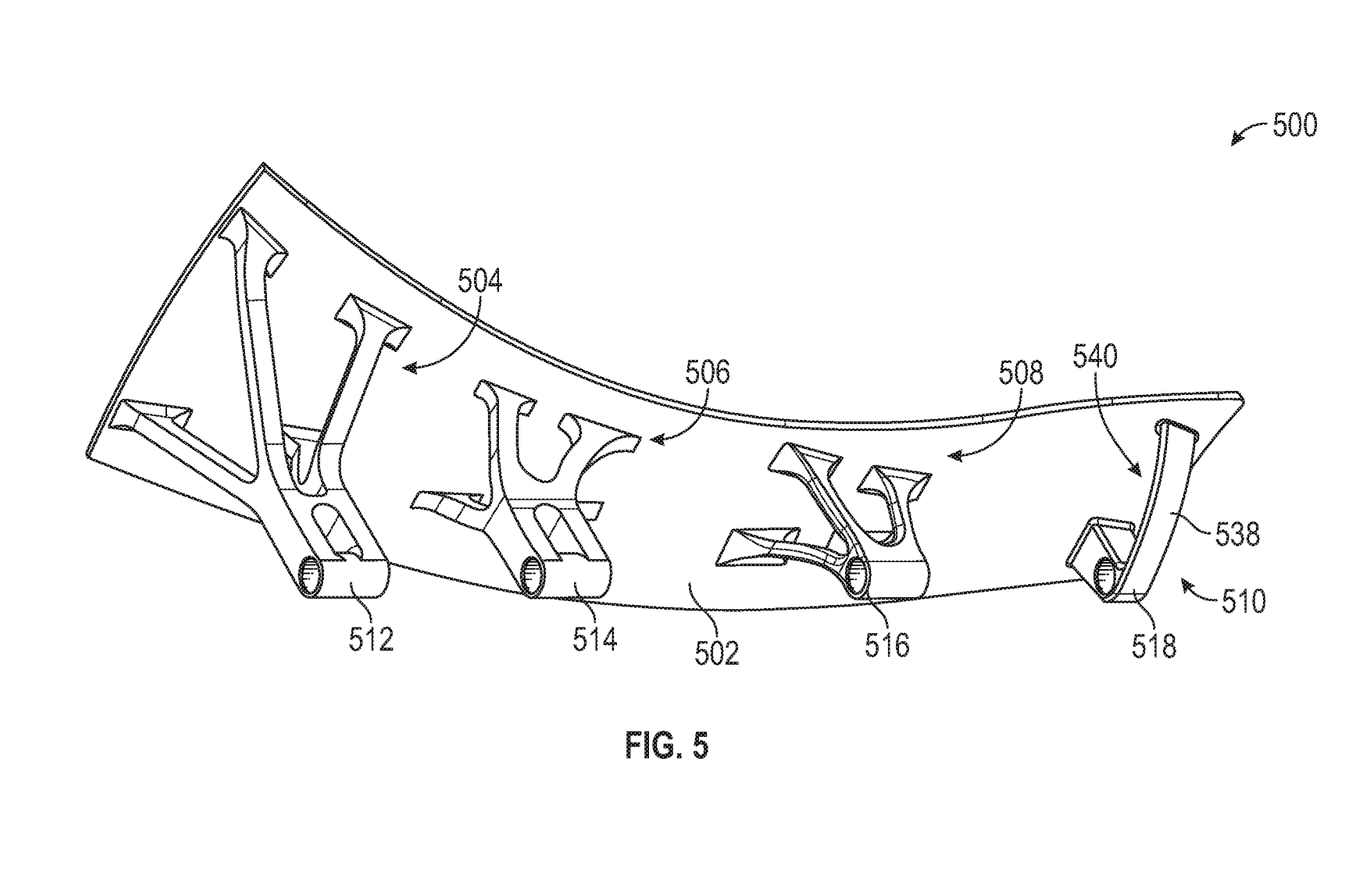
FIG. 5 is a schematic illustration of a platform in accordance with an embodiment of the present disclosure.

Turning now to FIG. 5, a platform 500 in accordance with another embodiment of the present disclosure is schematically shown. The platform 500 is similar to the platform 400 of FIGS. 4A-4B and thus various features may not be described above. The platform 500 includes a first securing element structure 504, a second securing element structure 506, a third securing element structure 508, and a fourth securing element structure 510. The securing element structures 504, 506, 508, 510 each extend from a non-gaspath surface 502 of the platform 500 and connect to respective securing elements 512, 514, 516, 518. The securing elements 512, 514, 516, 518 define apertures for receiving a locking pin therethrough, and thus the apertures of the securing elements 512, 514, 516, 518 are all axially aligned. The primary difference between the platform 500 and the platform 400 is that the fourth securing element structure 510 includes a respective fourth leg 538 that defines a respective fourth hollow space 540.

Although only a limited number of illustrative embodiments are provided herein, those of skill in the art will appreciate that alternative arrangements are possible without departing from the scope of the present disclosure. For example, the number of securing element structures and/or securing elements may be changed depending on the particular application. Moreover, the number of legs and/or necks of a given securing element structure may be customized based on a specific application.

The contact point between the legs and the non-gaspath surface may be optimized to minimize the amount of material used, while maintaining the structure, rigidity, and robustness of the platforms of the present disclosure.

In some embodiments of the present disclosure, a design of the platform may be achieved using front and side view 2D sketch configurations. The basis for designs are constrained by attachment points to the rotor disks or lugs, and a constrained aero-structure of arbitrary thickness, with the aero-structure having and defining the gaspath and non-gaspath surfaces. That is, the securing element structures of the present disclosure connect the aero-structure to one or more securing elements to allow attachment of the aero-structure to a rotor disk or lug. During modeling, the aero-structure and the securing elements will define fixed points. The legs and necks of the securing element structures may then take any shape, size, geometry, etc. (e.g., curves, straight lines, bends, etc.) that connect the two (the aero-structure and the securing element) in any fashion. The legs are arranged to contact and attach to the aero-structure (on the non-gaspath surface) at locations to counter high deflections and high stresses, and allow simplified shape control.

The cross-sectional structure of the legs and necks of the securing element structures may take any number of forms. For example, in some embodiments, the securing element structures may be, but are not limited to, solid material, hollow material, honeycomb or latticed, and/or combinations thereof. Accordingly, in some embodiments, the securing element structures may have a hollow or partially hollow internal structure. Moreover, the exterior profile shape of the securing element structures in cross-section may include, but is not limited to, circular, tubular, rectangular, and/or triangular.

It is noted that alternative arrangements may incorporate rib-like structures. The ribs, in some arrangements, are triangular strut supporting structures that connect between a lug and a gaspath surface. However, such arrangements do not include any negative space, holes, pockets, etc. in between the non-gaspath surface and the lugs (e.g., does not include the hollow spaces described above). Stated another way, from the lug to the non-gaspath surface, the ribs form a continuous straight surface.

In accordance with some embodiments of the present disclosure, the platforms may be formed using additive manufacturing processes, although such formation is not to be limiting. Additive manufacturing may enable unique shape generation for the securing element structures described herein. Such geometries and material structures may not be possible with some traditional machining techniques. The unique leg and neck provided herein allows for platform deflection control. Such deflection control during operation provides highly efficient systems that are operationally similar to composite systems, but are more robust in being made from metals and metal alloys.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A platform for an airfoil in a gas turbine engine, the platform comprising:
   an aero-structure defining a gaspath surface and a non-gaspath surface;
   a first securing element arranged to receive a locking pin and secure the aero-structure to a rotor disk; and
   a first securing element structure extending between the non-gaspath surface and the first securing element, wherein the first securing element structure comprises:
   a neck connected to the first securing element; and
   at least two legs connected to the non-gaspath surface at one end and material of each leg joins to the neck at an opposing end, the at least two legs defining a hollow space between the at least two legs and the non-gaspath surface,
   wherein the neck defines a structure that extends from a point where the material of the at least two legs join at the neck and the neck extends to the first securing element, wherein the hollow space is defined between the point where the material of the at least two legs join and the non-gaspath surface.

2. The platform of claim 1, wherein the platform is made of metal.

3. The platform of claim 1, further comprising:
   a second securing element arranged to receive the locking pin and secure the aero-structure to the rotor disk, wherein the second securing element is axially aligned with the first securing element; and
   a second securing element structure extending between the non-gaspath surface and the second securing element.

4. The platform of claim 3, wherein the second securing element structure comprises at least two legs defining a hollow space between the two legs and the non-gaspath surface.

5. The platform of claim 3, further comprising a connector connecting the first securing element structure to the second securing element structure.

6. The platform of claim 3, further comprising:
   a third securing element arranged to receive the locking pin and secure the aero-structure to the rotor disk, wherein the third securing element is axially aligned with the first securing element and the second securing element; and
   a third securing element structure extending between the non-gaspath surface and the third securing element.

7. The platform of claim 6, wherein the third securing element structure comprises at least two legs defining a hollow space between the two legs and the non-gaspath surface.

8. The platform of claim 6, further comprising:
a fourth securing element arranged to receive the locking pin and secure the aero-structure to the rotor disk, wherein the fourth securing element is axially aligned with the first securing element, the second securing element, and the third securing element; and
a fourth securing element structure extending between the non-gaspath surface and the fourth securing element.

9. The platform of claim 8, wherein the fourth securing element structure comprises at least one leg defining a hollow space between the leg and the non-gaspath surface.

10. The platform of claim 1, wherein the first securing element structure comprises four legs.

11. The platform of claim 1, wherein the first securing element structure has at least one of a hollow internal structure, a honey comb internal structure, or a lattice internal structure.

12. A gas turbine engine comprising:
a rotor disk;
an airfoil installed to the rotor disk; and
a platform installed to the rotor disk adjacent the airfoil, the platform comprising:
an aero-structure defining a gaspath surface and a non-gaspath surface;
a first securing element arranged to receive a locking pin and secure the aero-structure to the rotor disk; and
a first securing element structure extending between the non-gaspath surface and the first securing element, wherein the first securing element structure comprises:
a neck connected to the first securing element; and
at least two legs connected to the non-gaspath surface at one end and material of each leg joins to the neck at an opposing end, the at least two legs defining a hollow space between the at least two legs and the non-gaspath surface,
wherein the neck defines a structure that extends from a point where the material of the at least two legs join at the neck and the neck extends to the first securing element, wherein the hollow space is defined between the point where the material of the at least two legs join and the non-gaspath surface.

13. The gas turbine engine of claim 12, wherein the platform is made of metal.

14. The gas turbine engine of claim 12, further comprising:
a second securing element arranged to receive the locking pin and secure the aero-structure to the rotor disk, wherein the second securing element is axially aligned with the first securing element; and
a second securing element structure extending between the non-gaspath surface and the second securing element.

15. The gas turbine engine of claim 14, wherein the second securing element structure comprises at least two legs defining a hollow space between the two legs and the non-gaspath surface.

16. The gas turbine engine of claim 14, further comprising a connector connecting the first securing element structure to the second securing element structure.

17. The gas turbine engine of claim 12, wherein the rotor disk includes an attachment lug configured to receive the first securing element of the platform to secure the platform to the rotor disk.

18. The gas turbine engine of claim 17, further comprising a locking pin installed through at least a portion of the attachment lug and the securing element of the platform.

\* \* \* \* \*